Jan. 5, 1943.  O. E. STAPLES  2,307,428
HOBBING MACHINE
Filed Sept. 13, 1941  4 Sheets-Sheet 1

INVENTOR.
BY OTIS E. STAPLES
Kwis Hudson & Kent
ATTORNEYS

Jan. 5, 1943.   O. E. STAPLES   2,307,428
HOBBING MACHINE
Filed Sept. 13, 1941   4 Sheets-Sheet 2

INVENTOR.
OTIS E. STAPLES
Kerr, Hudson & Kent
ATTORNEYS

Jan. 5, 1943.   O. E. STAPLES   2,307,428
HOBBING MACHINE
Filed Sept. 13, 1941   4 Sheets-Sheet 3

INVENTOR.
OTIS E. STAPLES
ATTORNEYS

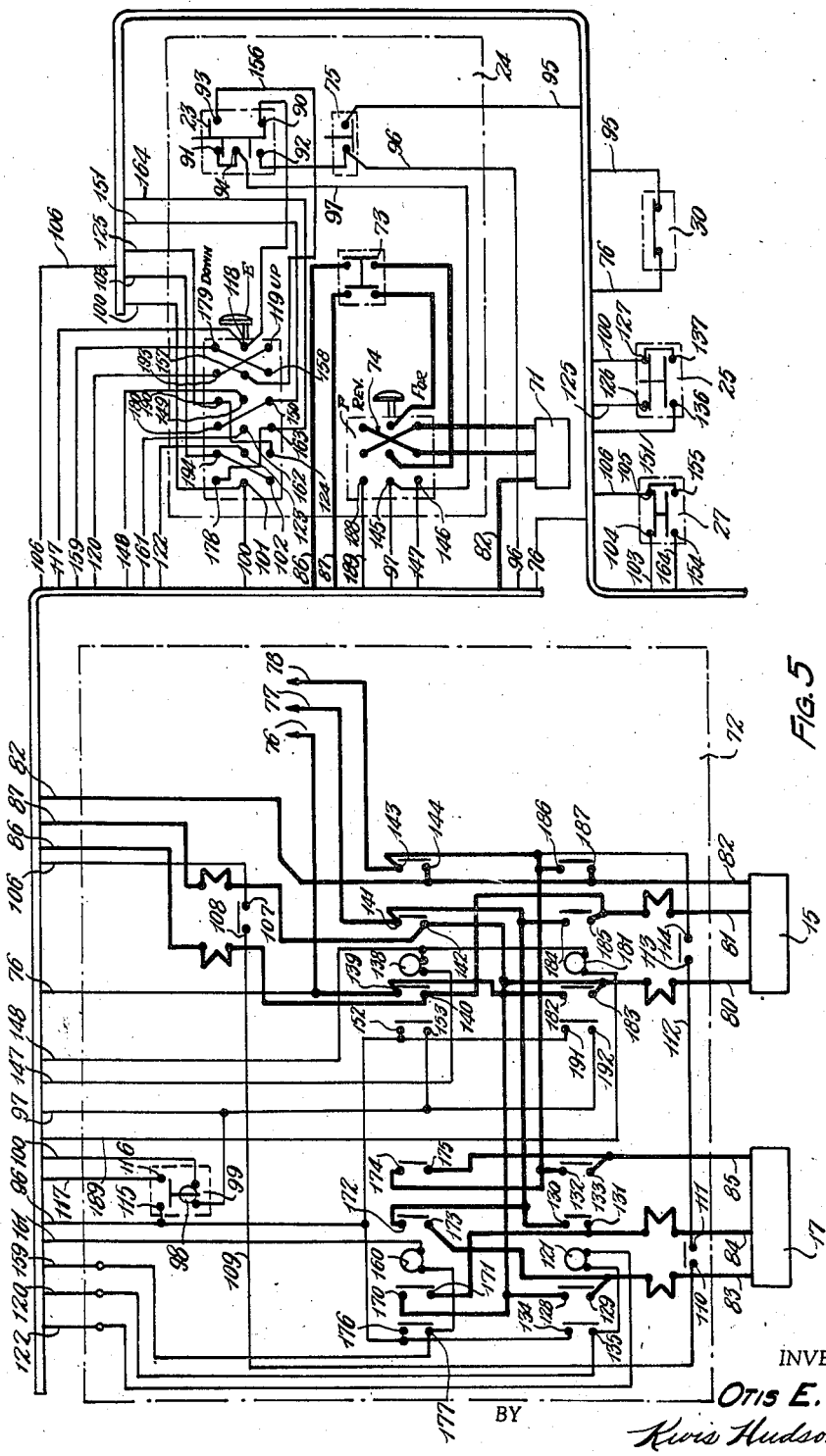

Patented Jan. 5, 1943

2,307,428

UNITED STATES PATENT OFFICE 2,307,428

HOBBING MACHINE

Otis E. Staples, Euclid, Ohio, assignor to The Cleveland Hobbing Machine Company, Cleveland, Ohio, a corporation of Ohio Application September 13, 1941, Serial No. 410,744

6 Claims. (Cl. 90—4)

The present invention relates to hobbing machines and is an improvement on the machine disclosed in U. S. Patent No. 2,231,866 to Frank H. Adams, issued February 18, 1941.

The principal object of the invention is the provision of a novel improved hobbing machine of the character referred to which can be operated either to cut in the conventional manner as does the machine of the aforesaid Adams Patent No. 2,231,866 or to cut according to the principles of "climb" hobbing as disclosed in U. S. Patent No. 2,211,611, issued August 13, 1940, of which I am the patentee, and which can be readily changed from "climb" hobbing to "conventional" hobbing and vice versa.

Further objects and advantages of the invention will be apparent to those skilled in the art to which the invention relates from the following description of the preferred embodiment described with reference to the accompanying drawings forming a part of this specification and in which:

Fig. 5 is a wiring diagram of the electrical circuits of the machine.

Figure 1:
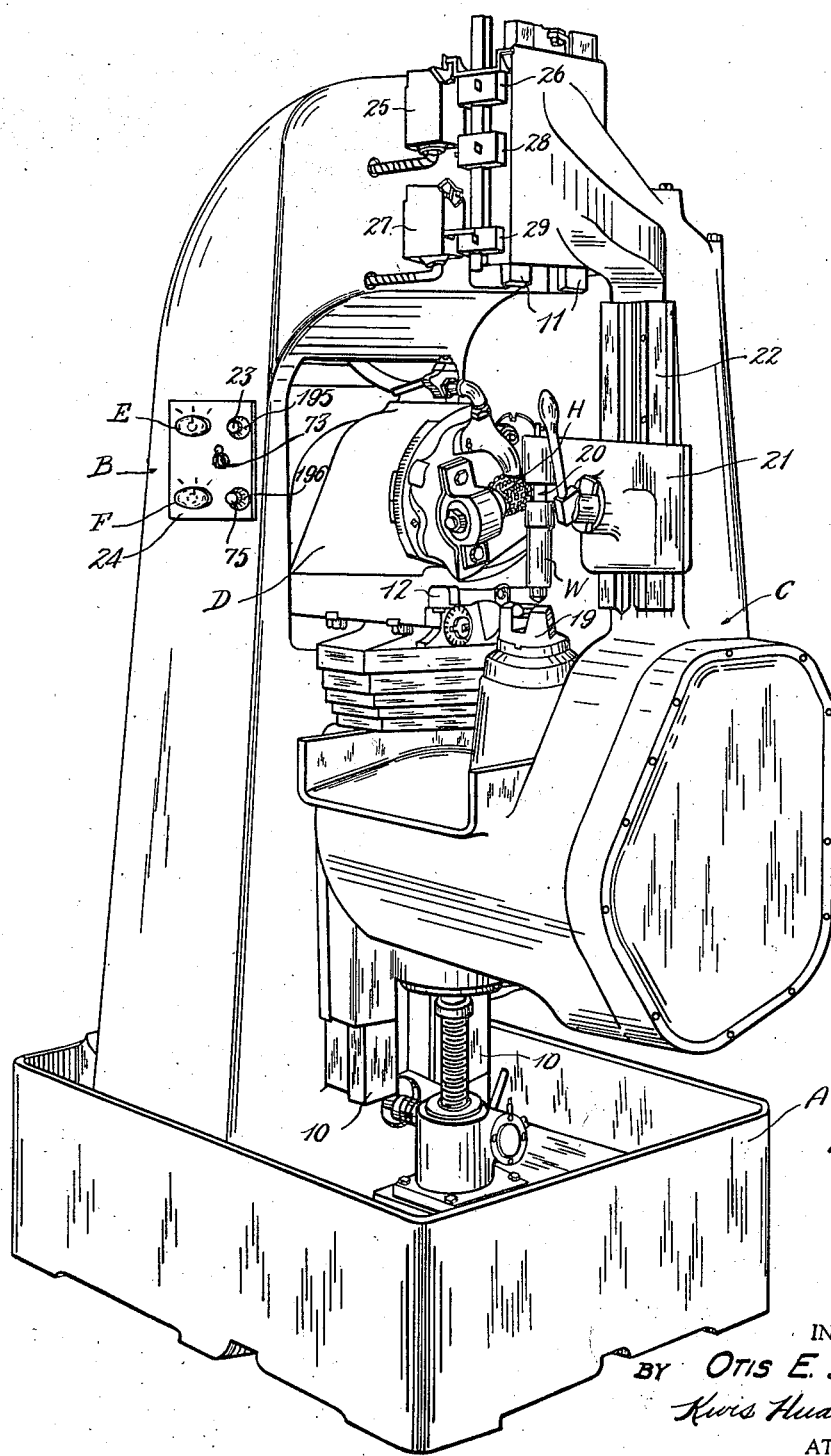
Fig. 1 is a perspective view of a hobbing machine embodying the present invention.

Generally speaking, the machine shown comprises a base A having a two-part vertical column B fixed thereto, a work head C slidably supported on the spaced vertical ways 10 and 11 on the column B, and a tool or hob head D adjustably supported on horizontal ways 12 intermediate the ways 10 and 11. The tool and work spindles 13 and 14, respectively, are geared together and driven from a reversible electric motor 15, hereinafter referred to as the cut motor. A relative feed movement between the spindles is effected by moving the work head C vertically through the medium of a lead screw 16 geared to the spindle drive. Means in the form of a high speed reversible electric motor 17 operatively connected to a nut 18 with which the lead screw 16 cooperates is provided for rapidly elevating or lowering the work head C, as the case may be, to quickly bring the work blank W up to or down to the hob H and/or to return the work head to its starting position after the cutting operation is completed and the finished piece removed.

In the embodiment shown, the work W is adapted to be supported between a suitable chuck 19 fixed to the upper end of the work spindle 14 and a center 20 carried by a tailstock 21 slidably supported on vertical ways 22 on the work head C.

After a work blank W is positioned in the work head, the machine is started by pushing a start push button switch 23 located on a switch panel 24 mounted on the side of the machine, whereupon the rapid traverse motor 17 operates to rotate the nut 18 at a high rate of speed and in such a direction that the work is rapidly moved toward the hob H. Just prior to the time the work W engages the hob H a switch 25 located on the left-hand side of the column B is actuated by an adjustable stop 26 carried by the work head C, stopping the rapid traverse motor 17 and starting the cut motor 15. The up and down limits of movement of the work head C are controlled by an electric switch 27 actuated by adjustable stops 28 and 29 also carried by the work head C. The stop 28 controls the downward limit of movement of the work head C and the stop 29 the upward limit of movement. After the blank has been cut and removed, the work head C is returned to its starting position by again depressing the start push button switch 23. For safety, a normally closed travel limit switch 30 is provided, see wiring diagram. The limit switch 30 is located on the right-hand side of the column B and for that reason is not shown in Figs. 1 and 2 of the drawings, but is so mounted and adapted to be opened by a fixed stop carried by the work head C that the work head C cannot be raised high enough to damage the machine even though the other switches fail.

The control system for the machine is so arranged that the cycle of operations of the machine can be started with the work head C in either of its normally extreme positions. In the embodiment shown the direction in which the cycle of operations is effected is controlled by drum controllers E and F also mounted on the switch panel 24. The drum controller E has two positions, designated "up" and "down," respectively. When the drum controller E is set in the "up" position, the circuits to the switches 25, 27, etc., are set up to execute the cycle of operations wherein the work head C moves in an upward direction to effect the feed, and vice versa. The drum controller F has two positions, designated "forward" and "reverse," respectively. When the controller is set in the "forward" position, the direction of rotation of the hob spindle is such that the hob moves up in front, that is in a clockwise direction as viewed in Fig. 1, and vice versa. Since the feed can be effected in either direction of movement of the work head C and since the cut motor which drives the hob can be reversed, it will be apparent that either "climb" hobbing or "conventional" hobbing can be effected in either direction merely by setting the drum controllers E and F in the selected positions and either inserting or removing an idler gear in the spindle drive change gears G or the feed change gears K, or in other words, by so selecting the change gears that the feed is in the proper direction.

Insofar as the mechanical features of the present machine are concerned, the machine is similar in construction to that disclosed in the aforesaid Adams Patent No. 2,231,866 and will not be described in detail. Suffice it to say that the tool and work spindles 13 and 14, respectively, are geared together and operatively connected to the cut motor 15 in the following manner. The cut motor 15 is operatively connected to a horizontal shaft 31, the forward end of which projects into the hob head D, by a flexible drive connection designated generally by the reference character 32. The shaft 31 is rotatably supported in the frame B by an anti-friction bearing 33 and the hub 34 of a gear 35, which gear is rotatably supported in a member 36 fixed to the frame B by an anti-friction bearing 37. The forward end of the shaft 31 is rotatably supported in the hob head D by a gear 38 splined to the shaft 31 and rotatably supported in the hob head by an anti-friction bearing 39. The gear 38 is continuously in mesh with a gear 40 fixed to one end of a short shaft 41 rotatably supported in the adjustable member 42 of the hob head D, the opposite end of which shaft is provided with a gear 43 continuously in mesh with a gear 44 keyed to the tool spindle 13. The tool spindle 13 is provided with a flywheel 45, as is well understood in the art.

The gear 35 is also splined to the shaft 31 and is continuously in mesh with a gear 46 fixed to the upper end of a vertical shaft 47 the lower splined end of which is provided with a gear 48 rotatably supported in the work head C. The splined portion of the shaft 47 permits the work head C to be moved vertically. The gear 48 is continuously in mesh with a gear 49 fixed to the rear end of a horizontal shaft 50 which projects forwardly through a partition 51 in the work head C and into a gear box or compartment designated generally by the reference character 52. The shaft 50 is operatively connected to a horizontal shaft 55 through the medium of the work spindle drive change gears G, the driving and driven gears 56 and 57 of which are keyed to the ends of the shafts 50 and 55, respectively. The shaft 55 is rotatably supported in an adjustable cradle 58 and is provided with a worm 59 continuously in mesh with a worm wheel 60 keyed to the work spindle 14.

The work head C is moved in timed relation to the rotation of the tool and work spindles during the cutting operation by the lead screw 16 previously referred to. The lead screw 16 is adapted to be rotated from the work spindle drive by a worm wheel 61 keyed to the upper end thereof, which worm wheel is continuously in mesh with a worm 62 fixed to a horizontal shaft 63 suitably supported in the work head D. The shaft 63, like the shafts 50 and 55, projects through the partition 51 and into the gear box 52 where it is operatively connected to the shaft 55 by the feed change gears K, the driving and driven gears 65 and 66, respectively, of which are fixed to the shafts 55 and 63, respectively.

It will be apparent from the foregoing that the direction of feed with respect to the direction of rotation of the tool and work spindles can be reversed by either inserting or removing an idler gear in the feed change gears K and that the direction of feed and the direction of rotation of the work spindle 14 can be reversed with reference to the direction of rotation of the tool or hob spindle 13 by inserting or removing an idler gear from the work spindle drive change gears G. For the purposes of permitting the use of various change gears, idlers, etc., in the work spindle drive change gears G and the feed change gears K, suitable spiders or gear supporting members 67 and 68 are provided. The particular arrangement shown in the present instance forms no part of this invention and is similar to that disclosed in the aforesaid Adams Patent No. 2,231,866.

Cutting fluid is supplied to the hob H during the cutting operation by a pump 70 driven by an electric motor 71 operatively connected to the motor controller on the controller panel 72 through the medium of which the cut motor 15 is connected and disconnected with the source of power in such a manner that the motor 71 can be operated only while the cut motor 15 is operating. A snap switch 73 mounted on the switch panel is connected in the circuit to the motor 71 so that the machine can be operated without operating the coolant pump as in setting up the machine.

The drum controller F also includes a reversing switch designated generally by the numeral 74 and is connected in the circuit to the motor 71 in such a manner that the motor 71 always rotates in a forward direction even though the direction of rotation of the cut motor 15 is reversed, thus enabling the coolant pump 70 to be operated in the forward direction at all times. The switch panel 24 also includes a normally closed stop push button switch 75 through the medium of which the machine may be stopped at any point in its operation.

The motors referred to are preferably of the reversible three-phase alternating current type and are adapted to be connected to and disconnected from the power lines 76, 77 and 78 by solenoid-actuated motor controllers of commercial design mounted on the controller panel 72. The construction and operation of these controllers is well understood in the art and will not be described in detail. The controller panel 72 is suitably housed within the column B and the wires employed in connecting the motors 15, 17 and 71 thereto are designated by the reference characters 80, 81 and 82; 83, 84 and 85; and 82, 86 and 87, respectively.

OPERATION

*"Conventional" cutting feed—"up"*

Figure 2:
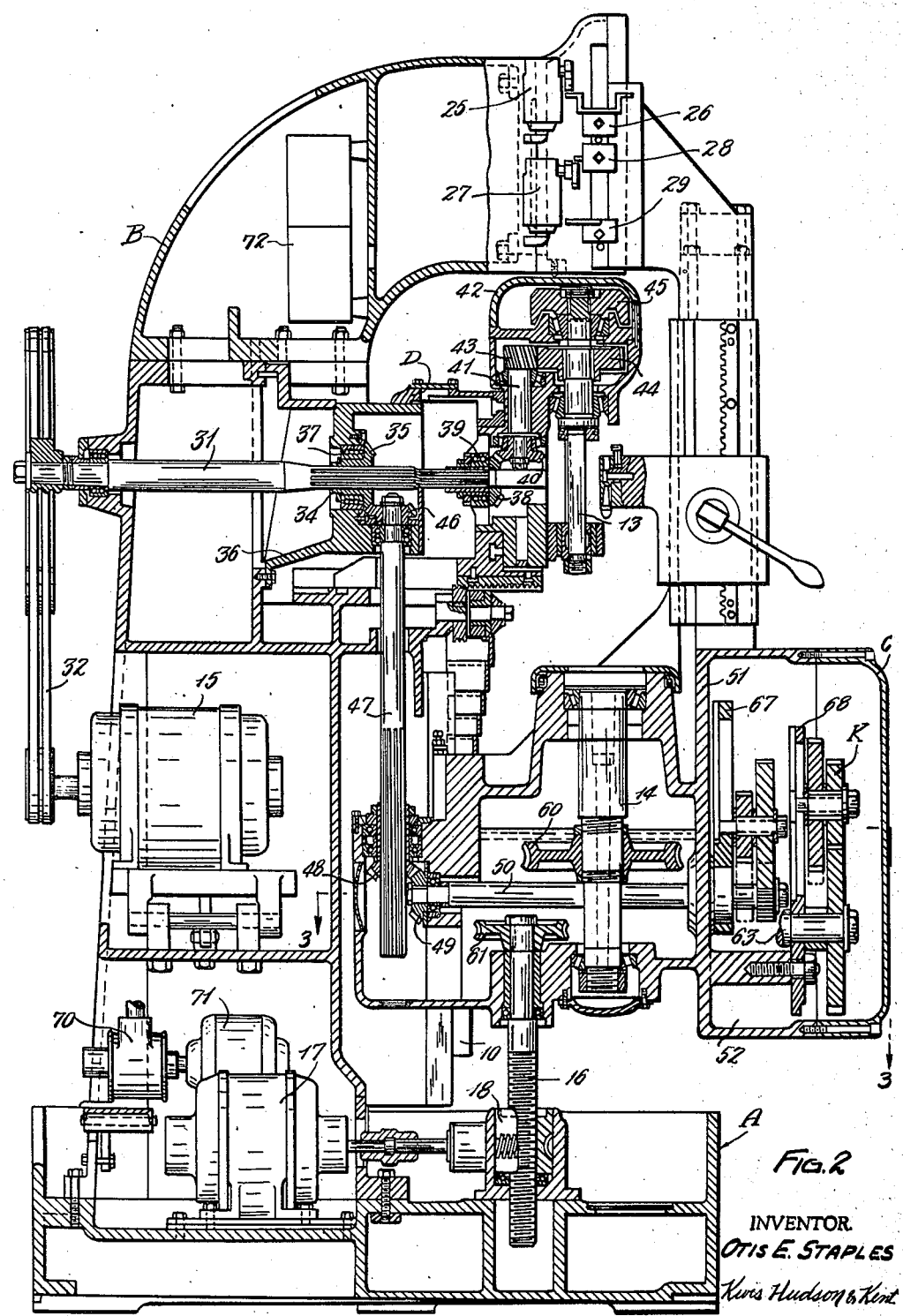
Fig. 2 is a vertical section through the machine shown in Fig. 1 approximately on the center line, with portions shown in elevation.
Figure 3:
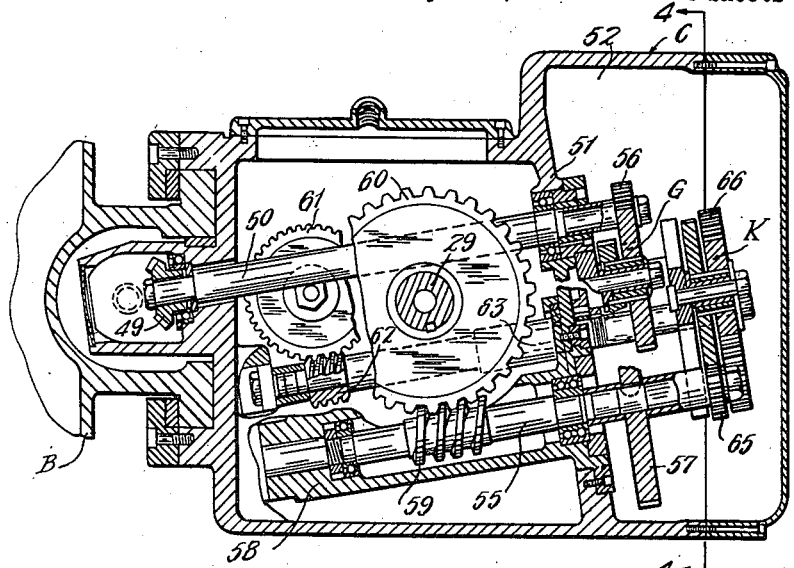
Fig. 3 is a section approximately on the line 3—3 of Fig. 2 with portions in elevation.
Figure 4:
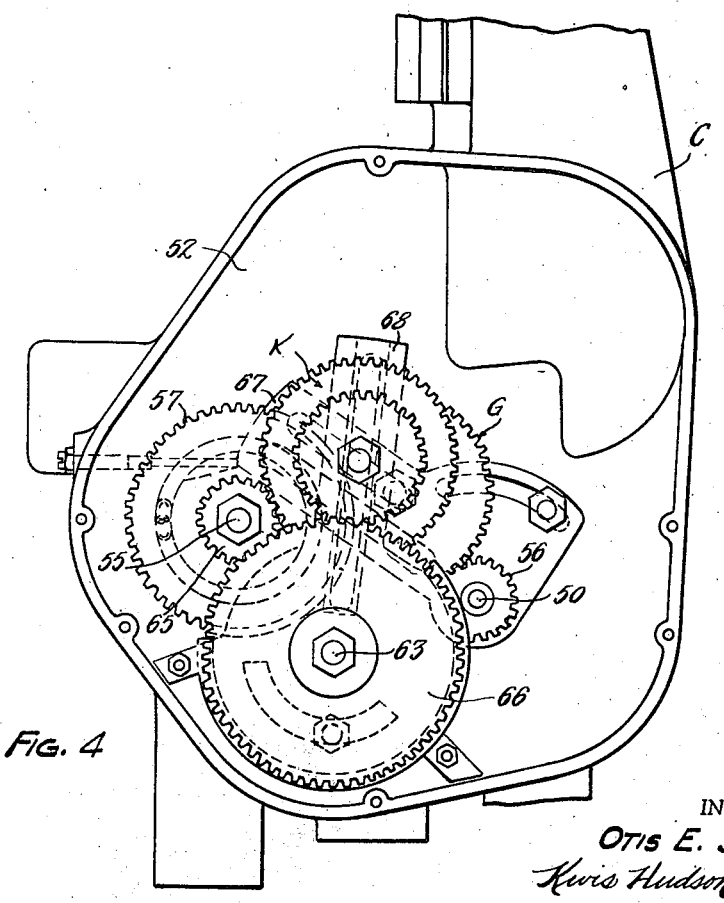
Fig. 4 is a section approximately on the line 4—4 of Fig. 3 with portions in elevation.

With the drum controller E set in its "up" position, the drum controller F set in its "forward" position, and the change gears as shown in the drawings, the machine is set up to go through its cycle of operations wherein the feed is effected by an upward movement of the work head C, with the hob rotating clockwise as viewed in Fig. 1. In other words, the cutting operation will be conventional. At the beginning of the cycle of operations the work head C is in its "down" position. After the operator has positioned a work blank in the work head C, the machine is started by depressing the start push button switch 23, opening the normally closed contacts 90, 91 and closing the normally open contacts 92, 93 and 94. The closing of the contacts 92 and 94 establishes a circuit from the line 76 through the overtravel limit switch 30, wire 95, normally closed stop push button switch 75, wire 96, contacts 92, 94, wire 97, operating solenoid 98 of relay 99, wire 100, contacts 101, 102 of drum controller E, wire 103, contacts 104, 105 of switch 27, wire 106, normally closed overload contacts 107, 108, for pump motor 71, wire 109, overload contacts 110, 111 for rapid traverse motor 17, wire 112, overload contacts 113, 114 for cut motor 15 to line 78, energizing the solenoid 98 of relay 99. Energization of the operating solenoid 98 of relay 99 closes the normally open contacts 115, 116 thereof, establishing a circuit from the line 76 through the limit switch 30, wire 95, stop push button switch 75, wire 96, contacts 115, 116, wire 117, contacts 118, 119 of drum controller E, wire 120, operating solenoid 121 of controller panel 72, wire 122, contacts 123, 124 of drum controller E, wire 125, contacts 126, 127 of switch 25, wire 100, contacts 101, 102 of drum controller E, wire 103, contacts 104, 105 of switch 27, wire 106, overload contacts 107, 108, wire 109, overload contacts 110, 111, wire 112, overload contacts 113, 114 to line 78. Energization of the solenoid 121 closes the main contacts 128, 129; 130, 131; 132, 133 for the travel motor 17 connecting the latter to the power lines in such a manner that the motor rotates in a direction to raise the work head C.

When the start push button switch 23 is released, the operating solenoid 98 for the relay 99 is maintained energized by a holding circuit including the normally closed contacts 90, 91 of the start push button switch 23. This circuit is from the line 76, through limit switch 30, wire 95, stop push button switch 75, wire 96, contacts 115, 116 of relay 99, wire 117, contacts 90, 91 of start push button switch 23, wire 97, operating solenoid 98 of relay 99, wire 100, contacts 101, 102 of drum controller E, wire 103, contacts 104, 105 of switch 27, wire 106, overload contacts 107, 108, wire 109, overload contacts 110, 111, wire 112, and overload contacts 113, 114 to line 78. Energization of the operating solenoid 121 of the motor controller for the rapid traverse motor 17 in addition to closing the main contacts 128, 129; 130, 131; 132, 133 and connecting the motor to the power lines, closes auxiliary contacts 134, 135 and establishes a holding circuit which maintains the operating solenoid energized. This holding circuit is from the line 76 through the limit switch 30, wire 95, stop push button switch 75, wire 96, contacts 134, 135, wire 120, solenoid 121 of controller panel 72, wire 122, contacts 123, 124 of drum controller E, wire 125, contacts 126, 127 of switch 25, wire 100, contacts 101, 102 of drum controller E, wire 103, contacts 104, 105 of switch 27, wire 106, overload contacts 107, 108, wire 109, overload contacts 110, 111, wire 112, and overload contacts 113, 114 to line 78.

The travel motor 17 continues to operate, raising the work head C until just prior to the engagement of the work W with the hob H, at which point the stop 26 on the work head C trips the switch 25, opening the previously closed contacts 126, 127 and closing the open contacts 136, 137. The opening of contacts 126, 127 of switch 25 breaks the holding circuit for the solenoid 121, stopping the rapid traverse or travel motor 17, and closing of the contacts 136, 137 of this switch energizes the operating solenoid 138 of the motor controller panel 72, closing the normally open main contacts 139, 140; 141, 142; 143, 144 and connecting the cut motor 15 to the power lines 76, 77 and 78 in such a manner that the motor operates in a direction to rotate the hob in a clockwise direction as viewed in Fig. 1, and to continue the elevation of the work head C but at a feed rate. The circuit through the operating solenoid 138 is from the line 76, through the limit switch 30, wire 95, stop push button switch 75, wire 96, contacts 115, 116 of relay 99, wire 117, normally closed contacts 90, 91 of start push button switch 23, wire 97, contacts 145, 146 of drum controller F, wire 147, solenoid 138, wire 148, contacts 149, 150 of drum controller E, wire 151, contacts 136, 137 of switch 25, wire 100, contacts 101, 102 of drum controller E, wire 103, contacts 104, 105 of switch 27, wire 106, overload contacts 107, 108, wire 109, overload contacts 110, 111, wire 112, and overload contacts 113, 114 to line 78.

Upon the energization of the operating solenoid 138 of the controller panel and the closing of the main contacts 139, 140; 141, 142; 143, 144 associated therewith, auxiliary contacts 152, 153 are also closed. The closing of these latter contacts establishes a holding circuit for the operating solenoid 98 of relay 99. This circuit is from the line 76, through the limit switch 30, wire 95, stop push button switch 75, wire 96, contacts 152, 153, wire 97, solenoid 98, wire 100, contacts 101, 102 of drum controller E, wire 103, contacts 104, 105 of switch 27, wire 106, overload contacts 107, 108, wire 109, overload contacts 110, 111, wire 112 and overload contacts 113, 114 to line 78.

Operation of the cut motor 15 continues until the work blank W is carried past the hob H and the cutting operation completed, whereupon the stop 29 on the work head C actuates the switch 27 to open the closed contacts 104, 105 thereof and close the contacts 154, 155. The opening of contacts 104, 105 of switch 27 de-energizes the circuit for the operating solenoid 98 of relay 99 and the operating solenoid 138 of the controller panel 72, stopping the cut motor 15. The closing of contacts 154, 155 of switch 27 rearranges the circuits in such a manner that the travel motor 17 will be operated in the reverse manner to lower the work head C when the start push button switch 23 is again depressed.

The finished work blank is now removed from the work head C and the start push button switch 23 again depressed to actuate the rapid traverse or travel motor 17 in a reverse direction to lower the work head C to its starting position. When the start push button switch 23 is depressed for the second time, a circuit is established from the line 76, through the limit switch 30, wire 95, stop push button switch 75, wire 96, contacts 92, 93 of start push button switch 23, wire 156, contacts 157, 158 of drum controller E, wire 159, operating solenoid 160 of controller panel 72, wire 161, contacts 162, 163 of drum controller E, wire 164, contacts 154, 155 of switch 27, wire 106, overload contacts 107, 108, wire 109, overload contacts 110, 111, wire 112 and overload contacts 113, 114 to line 78.

Energization of the solenoid 160 closes the main contacts 170, 171; 172, 173; 174, 175 associated therewith, connecting the rapid traverse or travel motor 17 to the power lines in such a manner that it operates in the reverse direction, that is, in a direction to lower the work head C. Simultaneously with the closing of the contacts which connect the motor 17 with the power lines, auxiliary contacts 176, 177 are closed, establishing a holding circuit for the solenoid 160 after the start push button switch 23 is released. This holding circuit is from the line 76, through the limit switch 30, wire 95, stop push button switch 75, wire 96, contacts 176, 177, wire 159, solenoid 160, wire 161, contacts 162, 163 of drum controller E, wire 164, contacts 154, 155 of switch 27, wire 106, overload contacts 107, 108, wire 109, overload contacts 110, 111, wire 112 and overload contacts 113, 114 to line 78.

As the work head C drops, the adjustable stop 26 thereon returns the switch 25 to its original position as the stop passes the switch. This reopens the contacts 136, 137 and closes the contacts 126, 127, thus again setting up the circuit with respect to the cut motor 15 which existed at the beginning of the cycle of operations. The work head C continues to move down until the switch 27 is tripped by the adjustable stop 28 carried by the work head C. This reopens the contacts 154, 155, stopping the rapid traverse or travel motor 17 and recloses the contacts 104, 105, returning the circuit to the rapid traverse or cut motor 17 to its original condition. After a new work blank is inserted in the work head C, the cycle of operations of the machine can be repeated by again pressing the start push button switch 23.

*"Conventional" cutting feed—"down"*

The machine shown can be operated so that the cutting operation will be in the conventional manner but the direction of feed will be downward by merely reversing the drum controllers E and F. In this event the drum controller F will be in its "reverse" position and the work spindle, when operated, will rotate in a counterclockwise direction, as viewed in Fig. 1, but the feed will be in a downward direction, from which it follows that the type of cutting will be the same as previously referred to or "conventional." With the drum controllers E and F in their new positions, that is, "down" and "reverse," respectively, and the work head C in its "upper" position, a circuit is established upon depressing the start push button switch 23 from the line 76, through the limit switch 30, wire 95, stop push button switch 75, wire 96, contacts 92, 94 of start push button switch 23, wire 97, operating solenoid 98 of relay 99, wire 100, contacts 101, 178, wire 164, contacts 154, 155 of switch 27, wire 106, overload contacts 107, 108, wire 109, overload contacts 110, 111, wire 112, and overload contacts 113, 114 to line 78. Energization of the operating solenoid 98 of relay 99 closes the normally open contacts 115, 116 thereof, establishing a circuit from the line 76, through the limit switch 30, wire 95, stop push button switch 75, wire 96, contacts 115, 116, wire 117, contacts 118, 179 of drum controller E, wire 159, operating solenoid 160 of motor control panel, wire 161, contacts 162, 180, wire 151, contacts 136, 137 of switch 25, wire 100, contacts 101, 178 of drum controller E, wire 64, contacts 154, 155 of switch 27, wire 106, overload contacts 107, 108, wire 109, overload contacts 110, 111, wire 112, and overload contacts 113, 114 to line 78. Energization of the solenoid 160 closes the main contacts 170, 171; 172, 173; 174, 175 of the travel motor 17 connecting the same to the power lines in such a manner that the motor rotates in a direction to lower the work head C.

When the start push button switch 23 is released, the operating solenoid 98 of relay 99 is maintained energized by a holding circuit including the normally closed contacts 90, 91 of start push button switch 23. This circuit is from the line 76, through the limit switch 30, wire 95, stop push button switch 75, wire 96, contacts 115, 116 of relay 99, wire 117, contacts 90, 91 of start push button switch 23, wire 97, operating solenoid 98 of relay 99, wire 100, contacts 101, 178 of drum controller E. wire 164, contacts 154, 155 of switch 27, wire 106, overload contacts 107, 108, wire 109, overload contacts 110, 111, wire 112, and overload contacts 113, 114 to line 78. In addition to closing the main contacts 170 to 175, inclusive, energization of the operating solenoid 160 closes auxiliary contacts 176, 177, establishing a holding circuit which thereafter maintains the operating solenoid 160 energized. This holding circuit is from the line 76, through the limit switch 30, wire 95, stop push button switch 75, wire 96, contacts 176, 177, wire 159, solenoid 160, wire 161, contacts 162, 180 of drum controller E, wire 151, contacts 136, 137 of switch 25, wire 100, contacts 101, 178 of drum controller E, wire 164, contacts 154, 155 of switch 27, wire 106, overload contacts 107, 108, wire 109, overload contacts 110, 111, wire 112, and overload contacts 113, 114 to line 78.

The travel motor 17 continues to operate, lowering the work head C until just prior to the engagement of the work W with the hob H, at which time the stop 26 on the work head C trips the switch 25, opening the closed contacts 136, 137 and closing the open contacts 126, 127. The opening of contacts 136, 137 breaks the holding circuit for the solenoid 160 stopping the rapid traverse or travel motor 17. The closing of contacts 126, 127 energizes the operating solenoid 181 of motor controller panel 72, closing the normally open main contacts 182, 183; 184, 185; 186, 187 and connecting the cut motor 15 to the power lines in such a manner that the motor operates in a direction to rotate the hob in a counterclockwise direction as viewed in Fig. 1 and to continue the downward movement of the work head but at a feed rate. The circuit through the operating solenoid 181 is from the line 76, through the limit switch 30, wire 95, stop push button switch 75, wire 96, contacts 115, 116 of relay 99, wire 117, normally closed contacts 90, 91 of start push button switch 23, wire 97, contacts 145, 188 of drum controller F, wire 189, operating solenoid 181, wire 148, contacts 149, 190 of drum controller E, wire 125, contacts 126, 127 of switch 25, wire 100, contacts 101, 178 of drum controller E, wire 164, contacts 154, 155 of switch 27, wire 106, overload contacts 107, 108, wire 109, overload contacts 110, 111, wire 112 and overload contacts 113, 114 to line 78.

Upon the energization of the operating solenoid 181 and the closing of the main contacts associated therewith, auxiliary contacts 191, 192 also close, establishing a holding circuit for the operating solenoid 98 of relay 99. This holding circuit is from the line 76, through the limit switch 30, wire 95, stop push button switch 75, wire 96, contacts 191, 192, wire 97, solenoid 98, wire 100, contacts 101, 178 of drum controller E, wire 164, contacts 154, 155 of switch 27, wire 106, overload contacts 107, 108, wire 109, overload contacts 110, 111, wire 112, and overload contacts 113, 114 to line 78. Operation of the cut motor 15 continues until the work blank W is carried past the hob H and the cutting operation completed, whereupon the stop 29 actuates the switch 27 to open the closed contacts 154, 155 thereof and close the contacts 104, 105. The opening of contacts 154, 155 deenergizes the circuit to the operating solenoid 98 of relay 99 which in turn opens the circuit to the operating solenoid 181 of controller panel 72, stopping the cut motor 15. The closing of contacts 104, 105 rearranges the circuits in such a manner that the travel motor 17 will be operated in the reverse direction, that is, in a direction to raise the work head C when the start push button switch 23 is again depressed.

The finished work blank is now removed from the work head C after which the start push button switch 23 is depressed. This establishes a circuit from the line 76, through the limit switch 30, wire 95, stop push button switch 75, wire 96, contacts 92, 93 of start push button switch 23, wire 156, contacts 157, 193 of drum controller E, wire 120, operating solenoid 121 of controller panel 72, wire 122, contacts 123, 194 of drum controller E, wire 103, contacts 104, 105 of switch 27, wire 106, overload contacts 107, 108, wire 109, overload contacts 110, 111, wire 112, and overload contacts 113, 114 to line 78.

Energization of the solenoid 121 closes the main contacts 128 to 133 associated therewith, connecting the rapid traverse or travel motor 17 to the power lines in such a manner that it operates in the opposite or forward direction, that is, in a direction to raise the work head C. Simultaneously with the closing of the main contacts, auxiliary contacts 134, 135 also close, establishing a holding circuit for the solenoid 121 which maintains the solenoid energized after the start push button switch 23 is released. This holding circuit is from the line 76, through limit switch 30, wire 95, stop push button switch 75, wire 96, contacts 134, 135, wire 120, solenoid 121, wire 122, contacts 123, 194 of drum controller E, wire 103, contacts 104, 105 of switch 27, wire 106, overload contacts 107, 108, wire 109, overload contacts 110, 111, wire 112, and overload contacts 113, 114 to line 78.

As the work head C rises, the adjustable stop 26 returns the switch 25 to its starting position as the stop passes the switch. This reopens the contacts 126, 127 and closes the contacts 136, 137, thus setting up the circuit with respect to the cut motor 15 which existed at the beginning of the cycle of operations. The work head C continues to move in an upward direction until the switch 27 is tripped by the adjustable stop 28. This opens the contacts 104, 105, stopping the rapid traverse or travel motor 17 and closes the contacts 154, 155, returning the circuit to the condition which existed at the beginning of the cycle of operations. After a new work blank is inserted in the work head C, the cycle of operations can be repeated by again depressing the start push button switch 23.

*"Climb" cutting feed—"up"*

By inserting an idler gear in the feed change gears K, the direction of feed is reversed without reversing the direction of rotation of the hob. In other words, with the drum controller set at "reverse," the hob will now rotate in the counterclockwise or reverse direction as viewed in Fig. 1, while the feed will be "up" instead of "down." With the feed "up" and the hob rotating in the counterclockwise direction, the hob will attempt to climb the work during the cutting operation or the operation will be "climb" cutting. With the drum controller E set in its "up" position and the work head C in its lower position, the original cycle of operations described will be repeated upon the switch 27 being depressed, except for the fact that the hob will rotate in a counterclockwise direction. The circuits will be similar to those previously referred to and will not be again described in detail.

*"Climb" cutting feed—"down"*

The machine can be operated to effect "climb" cutting but with the feed being produced by a downward movement of the work head C by leaving the idler gear in the change gears K and reversing the drum controllers E and F, that is, by setting these controllers in their "reverse" and "down" positions, respectively. The cycle of operations is the same as that described with respect to the "Conventional" cutting feed—"down", except for the fact that the hob rotates in a clockwise direction as viewed in Fig. 1. The circuits will be similar to those previously described and will not be again described in detail.

Both the start push button switch 23 and the stop push button switch 75 are of commercial construction and include ferrules 195 and 196 respectively. By turning the ferrule 195 associated with the start push button switch 23, the same can be secured in an intermediate position with all the contacts thereof open. When the switch is set in this position the machine stops at the point in the cycle of operations where normally the rapid traverse motor 17 stops and the cut motor 15 starts. This is useful in setting up the machine. Through the medium of the ferrule 196 the stop button can be fixed in an open position, in which event the machine cannot be operated. This may be advantageous either when setting up the machine or in making repairs. While in the preferred embodiment of the invention described the voltage of the control circuit is shown the same as that of the power circuits it will be understood that these voltages need not be the same but, if desired, a lower voltage can be employed for the control circuits than that of the power circuits.

From the foregoing description of the preferred embodiment of the invention, it will be evident that a new and improved hobbing machine has been provided which can be operated either to cut in the "conventional" manner or according to the principles of "climb" hobbing with the relative feed movement between the hob and the work taking place in either direction by the mere manipulation of a limited number of simple controls. While the preferred embodiment of the invention has been described in considerable detail, it is to be understood that the invention is not limited to the particular construction shown and described, for example, the hob may be moved to effect the relative feed movement, etc., between the tool and the work, and it is my intention to hereby cover all adaptations, modifications and uses thereof coming within the practice of those skilled in the art to which the invention relates and the spirit and scope of the appended claims.

Having thus described my invention what I claim is:

1. A hobbing machine of the character described comprising: a frame; a work spindle;

means for rotatably supporting said work spindle; a hob or tool spindle; means for rotatably supporting said hob or tool spindle; a lead screw and a cooperating nut for producing relative movement between said work spindle and said tool spindle; means for rotating said spindles and for producing relative rotation between said lead screw and said nut in opposite directions to effect a relative movement between said spindles at a feed rate; a second means for producing relative rotation between said lead screw and said nut in opposite directions to effect a relative movement between said spindles at a rapid traverse rate; and control means for said first and second means comprising means for effecting the operation of the second mentioned means whereupon relative movement between said spindles is produced in one direction at a rapid traverse rate, means for automatically effecting the operation of the first mentioned means and discontinuing the operation of said second mentioned means upon said spindles reaching a predetermined relative position whereupon the relative movement between said spindles is continued but at a feed rate, means for automatically discontinuing the operation of said first mentioned means upon said spindles reaching a second predetermined relative position, means for effecting the operation of said second mentioned means but in such a manner that it operates in the reverse direction whereupon relative movement between said spindles is produced in the opposite direction at a rapid traverse rate, means for automatically discontinuing the operation of said second mentioned means upon said spindles reaching their starting or initial relative position, and means for varying the direction in which said cycle of operations is executed.

2. A hobbing machine of the character described comprising: a frame; a work spindle; means for rotatably supporting said work spindle; a hob or tool spindle; means for rotatably supporting said hob or tool spindle; a lead screw and a cooperating nut for producing relative movement between said spindles; a reversible electric motor for rotating said spindles and for producing relative rotation between said lead screw and said nut to effect a relative movement between said spindles at a feed rate; a second reversible electric motor for producing relative rotation between said lead screw and said nut to effect a relative movement between said spindles at a rapid traverse rate; and control means for said motors comprising means for operatively connecting the second mentioned electric motor to a source of power whereupon relative movement between said spindles is produced in one direction at a rapid traverse rate, means for automatically connecting the first mentioned motor to the source of power and disconnecting the second mentioned motor from the source of power upon said spindles reaching a predetermined relative position whereupon the relative movement between said spindles is continued but at a feed rate, means for automatically disconnecting the first mentioned motor from the source of power upon said spindles reaching a second predetermined relative position, means for connecting the second mentioned motor to the source of power but in such a manner that it operates in the reverse direction whereupon relative movement between said spindles is produced in the opposite direction at a rapid traverse rate, means for automatically disconnecting said second mentioned motor from the source of power upon said spindles reaching their starting or initial relative position, and means for selecting the direction in which said cycle of operations is executed.

3. A hobbing machine of the character described comprising: a frame; a vertical work spindle; means for rotatably supporting said work spindle; a hob or tool spindle; means for rotatably supporting said hob or tool spindle; a lead screw and a cooperating nut for producing relative movement between said spindles; a reversible electric motor for rotating said spindles and for producing relative rotation between said lead screw and said nut to effect a relative movement between said spindles at a feed rate; a second reversible electric motor for producing relative rotation between said lead screw and said nut to effect a relative movement between said spindles at a rapid traverse rate; and control means for said motors comprising means for operatively connecting the second mentioned electric motor to a source of power whereupon relative movement between said spindles is produced in one direction at a rapid traverse rate, means for automatically connecting the first mentioned motor to the source of power and disconnecting the second mentioned motor from the source of power upon said spindles reaching a predetermined relative position whereupon the relative movement between said spindles is continued but at a feed rate, means for automatically disconnecting the first mentioned motor from the source of power upon said spindles reaching a second predetermined relative position, means for connecting the second mentioned motor to the source of power but in such a manner that it operates in the reverse direction whereupon relative movement between said spindles is produced in the opposite direction at a rapid traverse rate, means for automatically disconnecting said second mentioned motor from the source of power upon said spindles reaching their starting or initial relative position, and means for selecting the direction in which said cycle of operations is executed.

4. A hobbing machine of the character described comprising: a frame; a work head slidably supported for movement along said frame; a vertical work spindle rotatably supported by said work head; a hob or tool spindle rotatably supported by said frame; a lead screw and a cooperating nut for moving said work head relative to said tool spindle; a reversible electric motor for rotating said spindles and for producing relative rotation between said lead screw and said nut in opposite directions to move said work head at a feed rate; a second reversible electric motor for producing relative rotation between said lead screw and said nut in opposite directions to move said work head at a rapid traverse rate; and control means for said motors comprising means for operatively connecting the second mentioned electric motor to a source of power whereupon said work head is moved in one direction at a rapid traverse rate, means for automatically connecting the first mentioned motor to the source of power and disconnecting the second mentioned motor from the source of power upon said work head reaching a predetermined position whereupon the movement of the work head continues but at a feed rate, means for automatically disconnecting the first mentioned motor from the source of power upon said tool head reaching a second predetermined position, means for connecting the second mentioned motor to the source of power but in such a manner that it operates in the reverse direction whereupon the work head is moved in the opposite direction at a rapid traverse rate, means for automatically disconnecting said second mentioned motor from the source of power upon said work head reaching its starting or initial position, and means for selecting the direction in which said cycle of operations is executed.

5. A hobbing machine of the character described comprising: a frame provided with a plurality of vertically spaced vertical guideways and a horizontal guideway therebetween; a work head slidably supported for movement along said vertical guideways; a tool head slidably supported for movement along said horizontal guideway; a vertical work spindle rotatably supported by said work head; a hob or tool spindle rotatably supported by said tool head; a lead screw and a cooperating nut for moving said work head relative to said tool head; a reversible electric motor for rotating said spindles and for producing relative rotation between said lead screw and said nut in opposite directions to move said work head at a feed rate; a second reversible electric motor for producing relative rotation between said lead screw and said nut in opposite directions to move said work head at a rapid traverse rate; and control means for said motors comprising means for operatively connecting the second mentioned electric motor to a source of power whereupon said work head is moved vertically in one direction at a rapid traverse rate, means for automatically connecting the first mentioned motor to the source of power and disconnecting the second mentioned motor from the source of power upon said work head reaching a predetermined position whereupon the vertical movement of the work head continues but at a feed rate, means for automatically disconnecting the first mentioned motor from the source of power upon said tool head reaching a second predetermined position, means for connecting the second mentioned motor to the source of power but in such a manner that it operates in the reverse direction whereupon the work head is moved in the opposite direction at a rapid traverse rate, means for automatically disconnecting said second mentioned motor from the source of power upon said work head reaching its starting or initial position, and means for selecting the direction in which said cycle of operations is executed.

6. A hobbing machine of the character described comprising: a frame provided with a plurality of vertically spaced vertical guideways and a horizontal guideway therebetween; a work head slidably supported for movement along said vertical guideways; a tool head slidably supported for movement along said horizontal guideway; a vertical work spindle rotatably supported by said work head; a hob or tool spindle rotatably supported by said tool head; a lead screw and a cooperating nut for moving said work head relative to said tool head; a reversible electric motor for rotating said spindles and for producing relative rotation between said lead screw and said nut in opposite directions to move said work head at a feed rate; a second reversible electric motor for producing relative rotation between said lead screw and said nut in opposite directions to move said work head at a rapid traverse rate; and control means for said motors comprising a manually operable switch, means controlled by said manually operable switch for operatively connecting the second mentioned electric motor to a source of power whereupon said work head is moved vertically in one direction at a rapid traverse rate, means for automatically connecting the first mentioned motor to the source of power and disconnecting the second mentioned motor from the source of power upon said work head reaching a predetermined position whereupon the vertical movement of the work head continues but at a feed rate, means for automatically disconnecting the first mentioned motor from the source of power upon said tool head reaching a second predetermined position, means controlled by said manually operable switch upon subsequent actuation thereof for connecting the second mentioned motor to the source of power but in such a manner that it operates in the reverse direction whereupon the work head is moved in the opposite direction at a rapid traverse rate, means for automatically disconnecting said second mentioned motor from the source of power upon said work head reaching its starting or initial position, and means for selecting the direction in which said cycle of operations is executed.

OTIS E. STAPLES.